(12) United States Patent
Fujita et al.

(10) Patent No.: US 8,300,129 B2
(45) Date of Patent: Oct. 30, 2012

(54) PIXEL DRIVE CIRCUIT, IMAGE CAPTURE DEVICE, AND CAMERA SYSTEM

(75) Inventors: Noritaka Fujita, Fukuoka (JP); Kenichi Takamiya, Fukuoka (JP); Ken Koseki, Kanagawa (JP); Hiroki Ui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/100,317

(22) Filed: May 4, 2011

(65) Prior Publication Data

US 2011/0205418 A1 Aug. 25, 2011

Related U.S. Application Data

(62) Division of application No. 12/233,735, filed on Sep. 19, 2008.

(30) Foreign Application Priority Data

Sep. 28, 2007 (JP) ................................ 2007-256598

(51) Int. Cl.
*H04N 3/14* (2006.01)
*H04N 5/335* (2011.01)
(52) U.S. Cl. .......................... 348/308; 348/296; 348/302
(58) Field of Classification Search .................. 348/294, 348/296, 302, 308
See application file for complete search history.

(56) References Cited

U.S. PATENT DOCUMENTS

| 6,847,398 B1 * | 1/2005 | Fossum ......................... 348/296 |
| 6,920,078 B2 * | 7/2005 | Cho ......................... 365/230.06 |
| 7,821,556 B2 * | 10/2010 | Masuyama .................. 348/302 |
| 2009/0086049 A1 * | 4/2009 | Fujita et al. ................. 348/222.1 |
| 2011/0205419 A1 * | 8/2011 | Fujita et al. .................... 348/308 |

FOREIGN PATENT DOCUMENTS

| JP | 2004-166269 | 6/2004 |
| JP | 2005-311736 | 11/2005 |
| JP | 2008-288903 | 11/2008 |
| JP | 2009-021889 | 1/2009 |

\* cited by examiner

*Primary Examiner* — Daniel M Pasiewicz
(74) *Attorney, Agent, or Firm* — SNR Denton US LLP

(57) ABSTRACT

A pixel drive circuit includes a plurality of pixel circuits each including a photoelectric converting unit for converting an incident light into an electric charge and accumulating the converted electric charge, the plurality of pixel circuits being arranged in a matrix shape, an address decoder for selecting the pixel circuits to be controlled which are arranged on an identical line, a storage circuit for storing operation information to be executed by the pixel circuits selected by the address decoder, and a control circuit for controlling an operation of the pixel circuits selected by the address decoder in accordance with a storage state of the storage circuit. The control circuit controls a charge discharging operation of discharging an electric charge remaining in the photoelectric converting unit of each of the pixel circuits. The storage circuit holds the storage state until the charge discharging operation is completed.

10 Claims, 13 Drawing Sheets

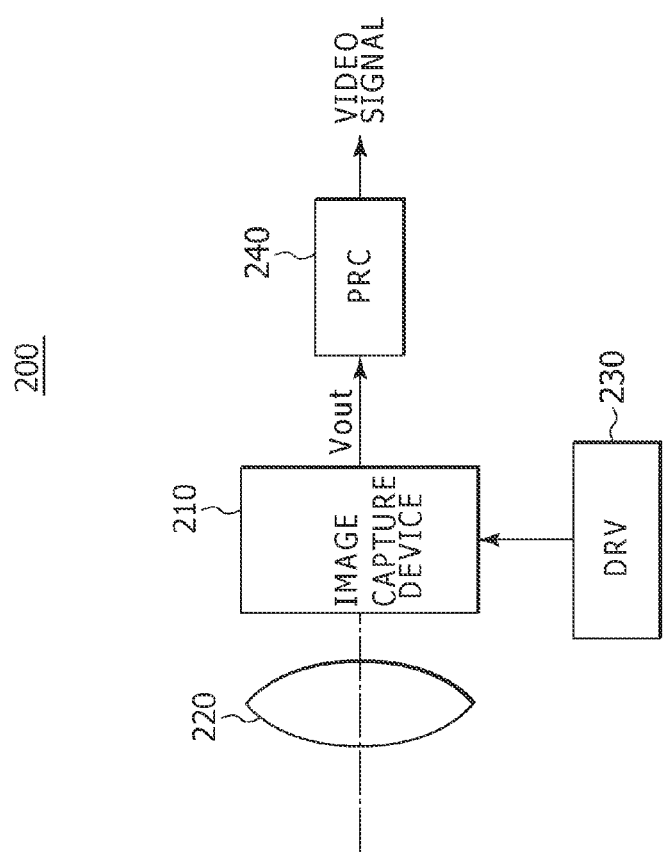

PRIOR ART FIG. 12
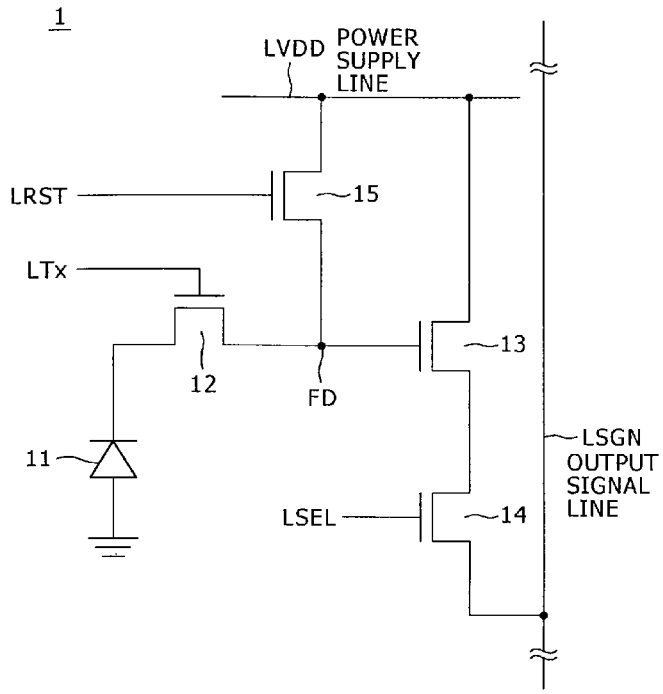
PRIOR ART FIG. 13A
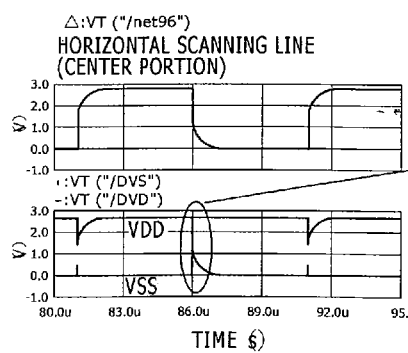
FIG. 13B PRIOR ART
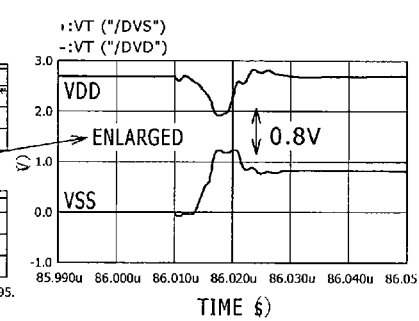

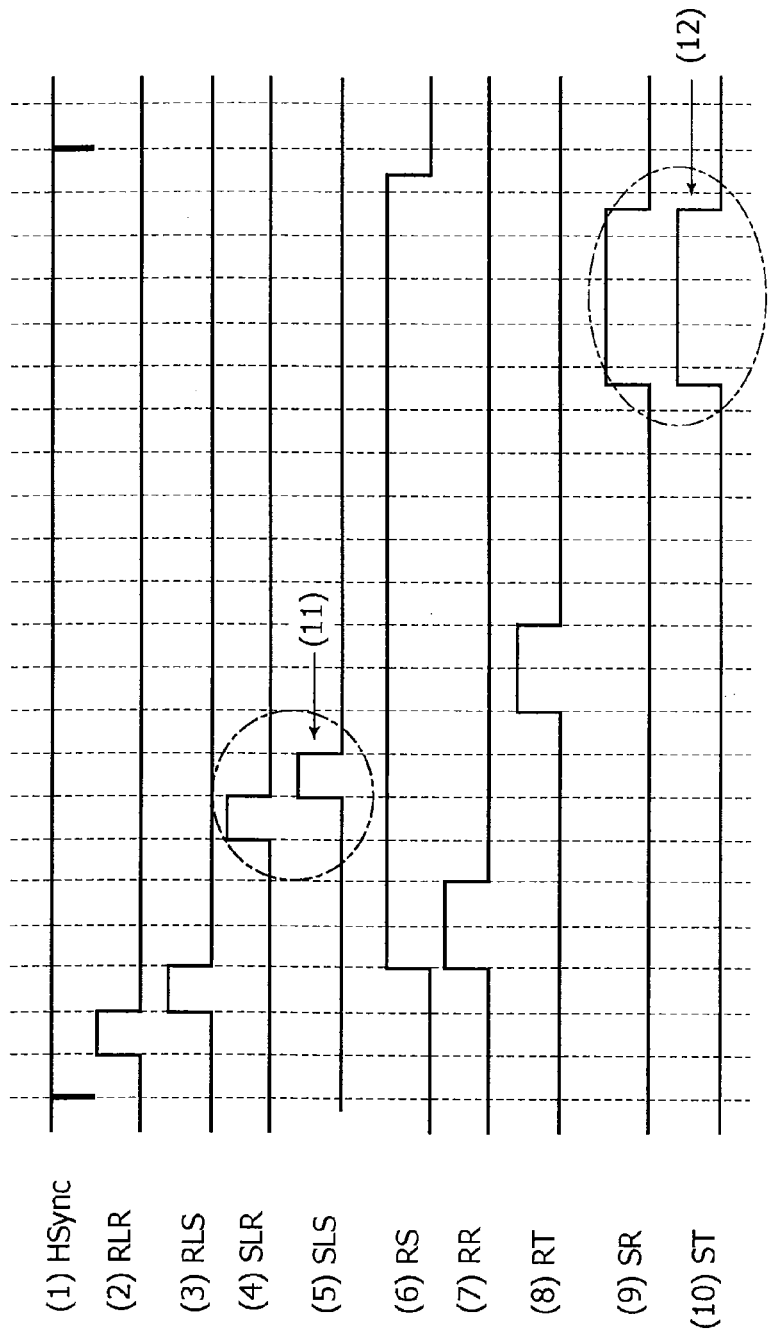

PIXEL DRIVE CIRCUIT, IMAGE CAPTURE DEVICE, AND CAMERA SYSTEM

RELATED APPLICATION DATA

This application is a division of U.S. patent application Ser. No. 12/233,735, filed Sep. 19, 2008, the entirety of which are incorporated herein by reference to the extent permitted by law. The present invention claims priority to Japanese Patent Application No. JP 2007-256598 filed in the Japanese Patent Office on Sep. 28, 2007, the entire contents of which are incorporated herein by reference.

BACKGROUND OF THE INVENTION

1. Field of the Invention

The present invention relates to a pixel drive circuit of a CMOS (Complementary Metal Oxide Semiconductor) type, for example, an image capture device, and a camera system.

2. Description of the Related Art

A CMOS image sensor (image capture device) has a plurality of advantages as follows: a partial reading which is difficult in a CCD (Charge Coupled Device) is possible; the image sensor can be driven by a single power supply; and an analog circuit and a logical circuit using a CMOS process may be mounted together on an identical chip. Because of the advantages, the CMOS image sensor is widely used for a camera, et al.

In such a CMOS image sensor, as shown in FIG. 12, a photodiode 11 as a photoelectric conversion element for converting an incident light into an electric charge is widely used. A pixel circuit 1 transfers the electric charges accumulated in the photodiode 11 via a transfer transistor 12 to a floating diffusion FD. The pixel circuit 1 performs a so-called electric-charge reading operation in which a potential, of the floating diffusion FD, corresponding to an amount of electric charges is amplified in an amplifier transistor 13 and outputted, as a voltage signal (image data), to a signal line LSGN via a selection transistor 14.

Many CMOS image sensors perform electronic shutter process for controlling an exposure time at a time of imaging after the reading operation. In the electronic shutter process, the transfer transistor 12 and a reset transistor 15 are simultaneously switched to ON, the electric charge left in the photodiode 11 is discharged to outside of the pixel circuit 1, thereby adjusting the incident light.

The CMOS image sensor has a processing function called a global shutter in which the electronic shutter processes are performed on all of a plurality of pixel circuits 1. To perform the global shutter, it may be necessary that control signals corresponding to the number of pixels of the image sensor are generated and all the pixel circuits are controlled at once. Such an electronic shutter process or a global shutter process is performed by successively controlling in a row direction a plurality of pixel circuits 1 in which pixel drive circuits are arranged in a matrix shape.

The pixel drive circuit may sometimes be configured to have a memory circuit per each row to impart a degree of freedom of the electronic shutter process to implement a downsizing of a circuit, and causes this storage circuit to store a row which is subject to processing before execution of the electronic shutter process (see Japanese Unexamined Patent Application Publication No. JP 2005-311736, Patent Document 1).

SUMMARY OF THE INVENTION

Due to an increased number of pixels and lowered power consumption in recent years, there occurs a problem of triggering a temporary voltage drop in the pixel drive circuit or other circuits during the global shutter. This problem occurs because when the number of pixels is further increased, the pixel circuits driven by the pixel drive circuit increase, thereby resulting in a need of controlling a large amount of pixel circuits at once.

On the other hand, in a manufacturing process of an image capture device of recent years, circuits of the entire CMOS image sensor are designed to operate at a low voltage. Therefore, as shown in FIGS. 13A and 13B, the voltage is lowered than an original power supply voltage VDD. As shown in an enlarged portion in FIG. 13B, when a difference in potential between the power supply voltage VDD and a ground potential VSS temporarily becomes small, since a circuit operation voltage is lowered, an influence caused on the circuit by a voltage variation is more apparent.

Depending on an oscillation width of the voltage drop, the voltage of the pixel circuit, et al, exceeds an operation threshold value voltage, which may trigger a malfunction of these circuits.

In particular, in a camera configured to store a subject row of the electronic shutter process, and then, to perform the process, if a timing of a storage state of the memory circuit ((5) in FIG. 14) (subject row of a pixel arrangement) and a timing of the electronic shutter process ((10) in FIG. 14) are time-divided (which corresponds to (11) and (12) in FIG. 14), an element, such as a transistor, which constitutes the memory circuit is malfunctioned resulting from the voltage drop, and a storage content stored previously is deleted, which may lead to a decrease in image quality of an captured image.

According to embodiments of the present invention, it is desirable to provide a pixel drive circuit in which an image quality of a captured image is not lowered even if an electronic shutter process for controlling an exposure time at a time of capturing an image is executed, an image capture device, and a camera system.

A pixel drive circuit according to a first aspect of the present invention includes a plurality of pixel circuits each including a photoelectric converting unit for converting an incident light into an electric charge and accumulating the converted electric charge, the plurality of pixel circuits being arranged in a matrix shape, an address decoder for selecting the pixel circuits arranged on an identical line to be subject to control, a storage circuit for storing operation information to be executed by the pixel circuits selected by the address decoder, and a control circuit for controlling an operation of the pixel circuits selected by the address decoder in accordance with a storage state of the storage circuit. The control circuit controls a charge discharging operation for discharging an electric charge remaining in the photoelectric converting unit of each of the pixel circuits, and the storage circuit maintains the storage state until the charge discharging operation is completed.

Preferably, the storage circuit includes a first storage circuit for storing information of the charge discharging operation, and a second storage circuit for storing operation information other than the charge discharging operation.

Preferably, there is provided a logical circuit for causing the storage circuit to store the information of the charge discharging operation irrespective of outputs of the address decoder.

Preferably, the logical circuit controls the charge discharging operation of each of the pixel circuits until the charge discharging operation is completed.

Preferably, there is provided a logical circuit for causing the control circuit to execute the charge discharging operation irrespective of the storage state of the first storage circuit.

Preferably, the logical circuit controls the charge discharging operation of each of the pixel circuits until the charge discharging operation is completed.

A pixel drive circuit according to a second aspect of the present invention includes a plurality of pixel circuits each including a photoelectric converting unit for converting an incident light into an electric charge and accumulating the converted electric charge, the plurality of pixel circuits being arranged in a matrix shape, an address decoder for selecting the pixel circuits arranged on an identical line to be subject to control, a storage circuit for storing operation information to be executed by the pixel circuits selected by the address decoder, and a control circuit for controlling an operation of the pixel circuits selected by the address decoder in accordance with a storage state of the storage circuit. The pixel circuit includes a node supplied with an electric charge accumulated by the photoelectric converting unit, an electric-charge discharging unit for discharging the electric charge of the node, an output unit for amplifying and outputting a potential of the node corresponding to an amount of the electric charge. The control circuit controls the electric-charge discharging unit and executes a charge discharging operation for discharging an electric charge accumulated by the photoelectric converting unit. The storage circuit maintains the storage state until the charge discharging operation is completed.

Preferably, the storage circuit includes a first storage circuit for storing information of the charge discharging operation, and a second storage circuit for storing operation information other than the charge discharging operation.

Preferably, there is provided a logical circuit for causing the storage circuit to store the information of the charge discharging operation irrespective of output of the address decoder.

Preferably, the logical circuit controls the charge discharging operation of each of the pixel circuits until the charge discharging operation is completed.

Preferably, there is provided a logical circuit for causing the control circuit to execute the charge discharging operation irrespective of the storage state of the first storage circuit.

Preferably, the logical circuit controls the charge discharging operation of each of the pixel circuits until the charge discharging operation is completed.

An image capture device according to a third aspect of the present invention includes a plurality of pixel circuits each including a photoelectric converting unit for converting an incident light into an electric charge and accumulating the converted electric charge, the plurality of pixel circuits being arranged in a matrix shape, a pixel drive circuit for successively selecting the pixel circuits and controlling the pixel circuits, and a reading unit for reading a signal from the pixel circuits controlled by the pixel drive circuit. The pixel drive circuit includes an address decoder for selecting the pixel circuits arranged on an identical line to be subject to control, a storage circuit for storing operation information to be executed by the pixel circuits selected by the address decoder, and a control circuit for controlling an operation of the pixel circuits selected by the address decoder in accordance with a storage state of the storage circuit. The control circuit controls a charge discharging operation for discharging an electric charge left in the photoelectric converting unit of each of the pixel circuits. The storage circuit holds the storage state until the charge discharging operation is completed.

A camera system according to a fourth aspect of the present invention includes an image capture device, an optical system for guiding an incident light to an image-capture area of the image capture device, and a signal processing circuit for processing a signal outputted by the image capture device. The image capture device includes a plurality of pixel circuits each including a photoelectric converting unit for converting an incident light into an electric charge and accumulating the converted electric charge, the plurality of pixel circuits being arranged in a matrix shape, a pixel drive circuit for successively selecting the pixel circuits and controlling the pixel circuits, and a reading unit for reading a signal from the pixel circuits controlled by the pixel drive circuit. The pixel drive circuit includes an address decoder for selecting the pixel circuits arranged on an identical line to be subject to control, a storage circuit for storing operation information to be executed by the pixel circuits selected by the address decoder, and a control circuit for controlling an operation of the pixel circuits selected by the address decoder in accordance with a storage state of the storage circuit. The control circuit controls a charge discharging operation for discharging an electric charge left in the photoelectric converting unit of each of the pixel circuits. The storage circuit holds the storage state until the charge discharging operation is completed.

According to embodiments of the present invention, the pixel drive circuit includes an address decoder for selecting the pixel circuits arranged on an identical line to be subject to control, a storage circuit for storing operation information to be executed by the pixel circuits selected by the address decoder, and a control circuit for controlling an operation of the pixel circuits selected by the address decoder in accordance with a storage state of the storage circuit. The control circuit controls a charge discharging operation for discharging an electric charge left in the photoelectric converting unit of each of the pixel circuits. The storage circuit holds the storage state until the charge discharging operation is completed.

According to embodiments of the present invention, there maybe provided a pixel drive circuit in which an image quality of a captured image is not lowered even if an electronic shutter process for controlling an exposure time at a time of capturing an image is executed, an image capture device, and a camera system

BRIEF DESCRIPTION OF THE DRAWINGS

FIG. 11 is a diagram showing one example of a configuration of a camera system to which the image capture device according to an embodiment of the present invention is applied;

FIG. 12 is a circuit diagram showing one example of a pixel circuit;

FIGS. 13A and 13B are graphs each showing one example of a pulse signal generated by a pixel drive circuit; and FIG. 14 is one example of a timing chart of a related-art CMOS image sensor.

DETAILED DESCRIPTION OF THE EMBODIMENTS

With reference to drawings, embodiments of the present invention are described below.

Figure 1:
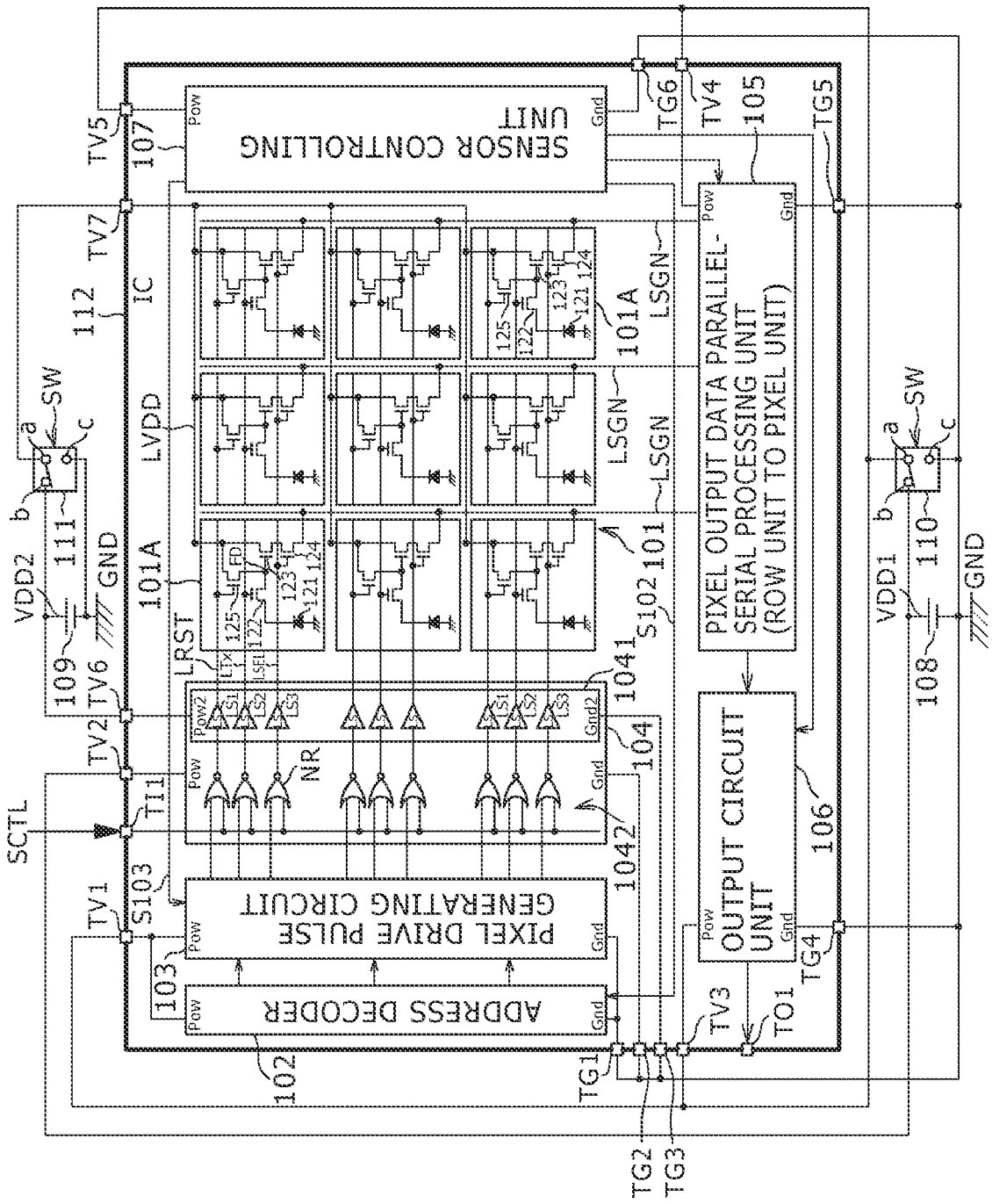
FIG. 1 is a diagram showing a configuration example of a CMOS image sensor according to embodiments of the present invention.

FIG. 1 is a diagram showing a configuration example of a CMOS image sensor according to an embodiment of the present invention.

A CMOS image sensor (image capture device) 100 illustrated in FIG. 1 includes a pixel array unit 101, an address decoder 102, a pixel drive pulse generating circuit 103, a pixel drive unit 104, a pixel output data parallel-serial processing unit 105, an output circuit unit 106, a sensor controlling unit 107, external power supplies (batteries) 108 and 109, and switches 110 and 111.

Noted, the address decoder 102, the pixel drive pulse generating circuit 103, and the pixel drive unit 104 correspond to a pixel drive circuit of the present invention and the pixel output data parallel-serial processing unit 105 corresponds to a reading unit of an embodiment of the present invention, respectively.

Out of these constituent elements, the pixel array unit 101, the address decoder 102, the pixel drive pulse generating circuit 103, the pixel drive unit 104, the pixel output data parallel-serial processing unit 105, the output circuit unit 106, and the sensor controlling unit 107 are integrated on an IC chip 112.

The IC chip 112 is formed thereon with power supply terminals TV1 to TV5 supplied with a power supply voltage VDD1 by the power supply 108, power supply terminals TV6 and TV7 supplied with a power supply voltage VDD2 by the power supply 109, power supply terminals TG1 to TG6 connected to a ground potential GND, an input terminal TI1 supplied with a control signal SCTL, for example, and an output terminal TO1.

On the IC chip 112, the power supply terminal TV1 is connected to power supply terminals Pow of the address decoder 102 and the pixel drive pulse generating circuit 103, the power supply terminal TV2 is connected to a power supply terminal Pow of the pixel drive unit 104, the power supply terminal TV3 is connected to a power supply terminal Pow of the output circuit unit 106, the power supply terminal TV4 is connected to a power supply terminal Pow of the pixel output data parallel-serial processing unit 105, and the power supply terminal TV5 is connected to a power supply terminal Pow of the sensor controlling unit 107.

The power supply terminal TV6 is connected to a power supply terminal Pow2 of a level shifter group 1041 provided in the pixel drive unit 104, and the power supply terminal TV7 is connected to each power supply line LVDD of the pixel array unit 101.

In the pixel array unit 101, a plurality of pixel circuits 101A are arranged in a matrix shape. In FIG. 1, for the sake of simplicity, the pixel array unit 101 is shown in the figure in a manner to have a pixel arrangement of three rows and three columns.

In FIG. 1, an example of a pixel of the CMOS image sensor 100 configured by four transistors is shown.

A pixel circuit 101A has a photodiode 121 as a photoelectric conversion element, for example, and further has the following four transistors, as active elements with respect to a single photodiode 121: a transfer transistor 122, an amplifier transistor 123, a selection transistor 124, and a reset transistor 125.

The transfer transistor 122 and the reset transistor 125 correspond to an electric-charge discharging unit of the present invention and the amplifier transistor 123 corresponds to an output unit of the present invention, respectively.

The photodiode 121 photoelectrically converts an incident light into an electric charge (in this case, an electron) having an amount which corresponds to an amount of the incident light.

The transfer transistor 122 is connected between the photodiode 121 and a floating diffusion FD. A gate (transfer gate) of the transfer transistor 122 is supplied with a drive signal through a transfer control line LTx, and whereby the electron photoelectrically converted at the photodiode 121 is transferred to the floating diffusion FD.

To the floating diffusion FD, a gate of the amplifier transistor 123 is connected. The amplifier transistor 123 is connected via the selection transistor 124 to a signal line LSGN, and constitute a source follower together with a constant current source outside a pixel portion.

An address signal is supplied to a gate of the selection transistor 124 through a selection control line LSEL. When the selection transistor 124 is turned on, the amplifier transistor 123 amplifies a potential of the floating diffusion FD and outputs, to the signal line LSGN, voltage corresponding to the potential. Through the signal line LSGN, the voltage outputted from each pixel is outputted to the pixel output data parallel-serial processing unit 105.

These operations are performed simultaneously for each pixel of one row because the respective gates of the transfer transistor 122, the selection transistor 124, and the reset transistor 125 are connected in units of rows, for example.

The reset control line LRST, the transfer control line LTx, and the selection control line LSEL wired in the pixel array unit 101 are wired, as one set, in units of each row of the pixel array.

The reset control line LRST, the transfer control line LTx, and the selection control line LSEL are driven by the pixel drive unit 104.

The address decoder 102 has a subject-row selection circuit (not shown) for selecting a row of the pixel array to be subject to control in response to an address control signal S102 of the sensor controlling unit 107, and selects the pixel circuit 101A in a row direction which is to be subject to control.

The pixel drive pulse generating circuit 103 has a memory (storage) circuit and a timing control circuit (not shown).

The pixel drive pulse generating circuit 103 generates a drive pulse per each row of the pixel array in response to control signal S103 of the sensor controlling unit 107, and outputs the generated drive pulse to the pixel drive unit 104.

The pixel drive pulse generating circuit 103 will be described in detail later.

The pixel drive unit 104 is configured by a level shifter group (a driver group) 1041 including a plurality of level shifters which are drivers of a control line to which each of the reset control line LRST, the transfer control line LTx, and the selection control line LSEL is connected and a control logical circuit group 1042 for controlling a drive of each level shifter LS of the level shifter group 1041.

In the level shifter group 1041, there are arranged three level shifters LS1, LS2, and LS3 each connected, per each row of the pixel array, with the reset control line LRST, the transfer control line LTx, and the selection control line LSEL.

When the power supply voltage VDD2 is powered on by the power supply 109 via the power supply terminal TV6, the level shifter group (driver group) 1041 is powered on and kept to an operated state even if the supply of the power supply voltage VDD1 to the other elements, such as the address decoder is stopped.

In the control logical circuit group 1042, a plurality of NOR gates NR for controlling inputs of the respective level shifters LS of the level shifter group 1041 are arranged to correspond to the array of the respective level shifters LS.

Outputs of the respective NOR gates NR are connected to inputs of the level shifters LS which are corresponding drivers. First input terminals are each connected to supply lines of the drive pulse by the pixel drive pulse generating circuit 103, and second input terminals are commonly connected to an input terminal TI1 of the IC chip 112.

The input terminal TI1, a control signal SCTL by a controller (not shown) is supplied, for example.

When the control signal SCTL is supplied at a high level, at least transfer control line LTx may caused to be a low level irrespective of the pulse signal from the pixel drive pulse generating circuit 103, and it is possible to hold the pixel circuit 101A in an electric-charge (signal) accumulating state.

In the switch 110, a fixed contact a is connected to the power supply terminals TV1, TV3, TV4, and TV5 of the IC chip 112, an actuating contact b is connected to a positive electrode of the power supply 108 and a power supply terminal TV2, and an actuating contact c is connected to a negative electrode of the power supply 108 and the power supply terminals TG1 to TG6.

The switch 110 connects the fixed contact a to the actuating contact b or c in response to a switching signal SW by a controller (or the sensor controlling unit 107) not shown, for example.

Specifically, the switch 110 is supplied with the switching signal SW so that the fixed contact a and the actuating contact b are connected during a normal whole operation. Accordingly, via the power supply terminals TV1 to TV5, the address decoder 102, the pixel drive pulse generating circuit 103, the pixel drive unit 104, the pixel output data parallel-serial processing unit 105, the output circuit unit 106, and the sensor controlling unit 107 of the IC chip 112 are supplied with the power supply voltage VDD1 by the power supply 108.

The switch 110 is supplied with the switching signal SW so that the fixed contact a and the actuating contact c are connected during an electric-charge accumulating period in the pixel array unit 101. Accordingly, the power supply terminals TV1, TV3, TV4, and TV5 are connected to the ground potential, and supply of the power supply voltage VDD1 by the power supply 108 to the address decoder 102, the pixel drive pulse generating circuit 103, the pixel output data parallel-serial processing unit 105, the output circuit unit 106, and the sensor controlling unit 107 of the IC chip 112 is stopped.

In the switch 111, the fixed contact a is connected to the power supply terminal TV7 of the IC chip 112, the actuating contact b is connected to the positive electrode of the power supply 109 and the power supply terminal TV6, and the actuating contact c is connected to the negative electrode of the power supply 108.

The switch 111 connects the fixed contact a to the actuating contact b or c in response to the switching signal SW by a controller (or the sensor controlling unit 107) not shown, for example.

Specifically, the switch 111 is supplied with the switching signal SW so that the fixed contact a and the actuating contact b are connected during a normal whole operation. Accordingly, via the power supply terminals TV6 and TV7, the level shifter group 1041 in the pixel drive unit 104 and the respective power supply lines LVDD of the pixel array unit 101 of the IC chip 112 are supplied with the power supply voltage VDD2 by the power supply 109.

The switch 111 is supplied with the switching signal SW so that the fixed contact a and the actuating contact c are connected during an electric-charge accumulating period in the pixel array unit 101. Accordingly, the power supply terminal TV7 is connected to the ground potential, the supply of the power supply voltage VDD2 by the power supply 109 to the respective power supply lines of the pixel array unit 101 of the IC chip 112 is stopped, and the respective power supply lines LVDD of the pixel array unit 101 are kept to the ground potential.

The pixel output data parallel-serial processing unit 105 reads out, via the signal line LSGN, the picture data (voltage signal) by a pixel from the pixel circuit 101A of the same column, and outputs the read data to the output circuit unit 106.

The output circuit unit 106 applies a process, such as amplification, to the image data inputted from the pixel output data parallel-serial processing unit 105, and outputs the image data to exterior of the IC chip 112.

(First Configuration Example of Pixel Drive Pulse Generating Circuit)

Subsequently, a first configuration example of the pixel drive pulse generating circuit 103 is described in detail.

Figure 2:
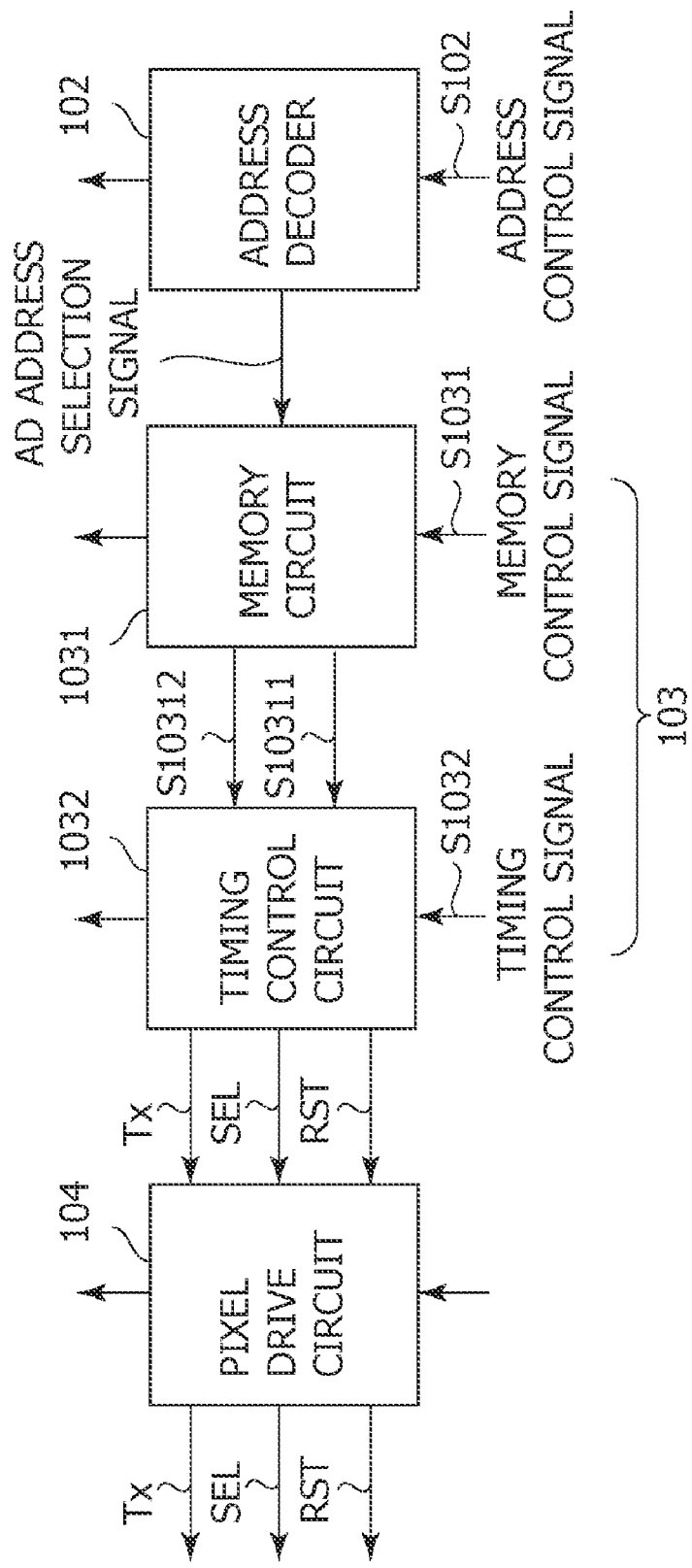
FIG. 2 is a block diagram showing a first configuration example of a pixel drive pulse generating circuit according to present embodiment.
Figure 3:
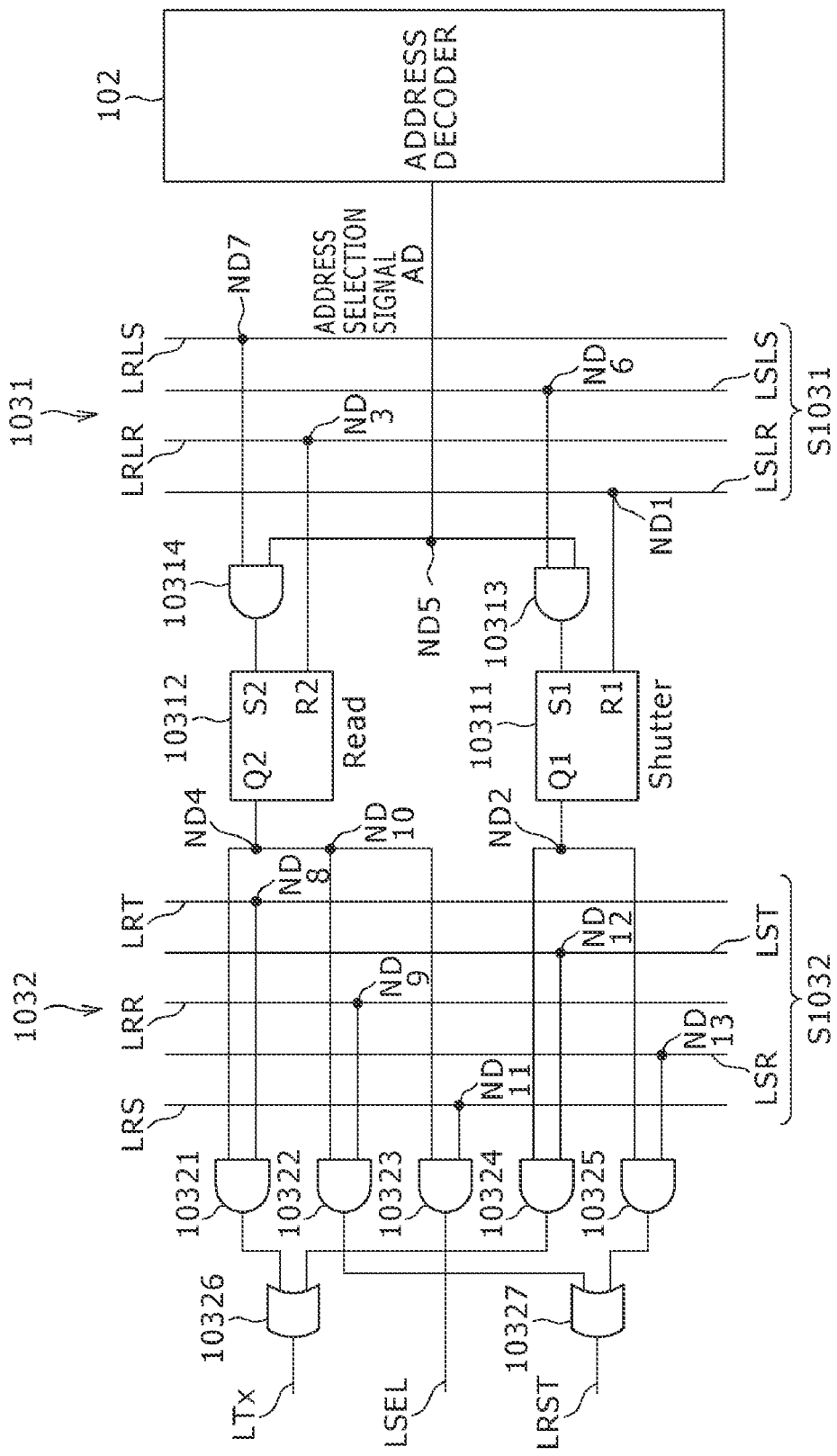
FIG. 3 is a detailed circuit diagram of the pixel drive pulse generating circuit according to present embodiment.

FIG. 2 is a block diagram showing the first configuration example of the pixel drive pulse generating circuit according to present embodiment. FIG. 3 is a detailed circuit diagram of the pixel drive pulse generating circuit according to present embodiment.

In order to simplify descriptions, in FIGS. 2 and 3, only a portion corresponding to a pixel arrangement of a first row in FIG. 1, for example, is illustrated, and only that portion is described.

As shown in FIG. 2, the pixel drive pulse generating circuit 103 includes a memory (storage) circuit 1031 and a timing control circuit 1032. The timing control circuit 1032 corresponds to a control circuit of an embodiment of the present invention.

As shown in FIG. 2, the address decoder 102 has a subject-row selection circuit (not shown) for selecting a pixel array which is subject to control in response to the address control signal S102, and outputs to the memory circuit 1031 the address selection signal AD per each pixel arrangement row which is subject to control.

The memory circuit 1031 stores operation information to be executed by the respective pixel circuits 101A of the pixel array selected by the address decoder 102 in response to the address selection signal AD inputted from the address decoder 102 and the memory control signal S1031 inputted from the sensor controlling unit 107, and outputs a signal S10311 or S10312 indicating a storage state to the timing control circuit 1032.

The signal S10311 or S10312 indicating the storage state is inputted from the memory circuit 1031 to the timing control circuit 1032. Further, the timing control circuit 1032 generates a reset control signal RST, a transfer control signal Tx, a selection control signal SEL for controlling the pixel circuit 101A of the row selected by the address decoder 102 in response to the timing control signal S1032 from the sensor controlling unit 107, and outputs the signals to the pixel drive unit 104.

The timing control circuit 1032 generates simultaneously a high-level reset control signal RST and transfer control signal Tx based on the signal S10311 outputted by the memory circuit 1031, and switches the transfer transistor 122 and the reset transistor 125 of the pixel circuit 101A to ON, in order to perform the electronic shutter process (charge discharging operation) for discharging the electric charge left in the photodiode 121 to exterior of the pixel circuit 101A via the selection transistor 124.

In order to simplify descriptions, names of the respective signals outputted by the timing control circuit 1032 are identical with names of the respective signals outputted by the pixel drive unit 104 (the reset control signal RST, the transfer control signal Tx, and the selection control signal SEL).

Hereinafter, a connection mode of the memory circuit 1031 is described with reference to FIG. 3.

The memory circuit 1031 includes a first memory (storage) circuit 10311, a second memory (storage) circuit 10312, an AND gate 10313, and an AND gate 10314.

The memory circuit 10311 includes a set terminal S1, a reset terminal R1, and an output terminal Q1. The set terminal S1 is connected to an output terminal of the AND gate 10313, the reset terminal R1 is connected to a signal line LSLR via a node ND1, and the output terminal Q1 is connected to a node ND2, respectively.

When a high-level signal is inputted to the set terminal S1, the memory circuit 10311 holds the state until a high-level signal is inputted to the reset terminal R1 and outputs the high-level signal to the output terminal Q1.

When the memory circuit 10311 holds (stores) a state of a high level (logical value is 1), this represents the electronic shutter process in which the transfer transistor 122 and the reset transistor 125 of the pixel circuit 101A shown in FIG. 1 are simultaneously switched to ON.

The memory circuit 10312 includes a set terminal S2, a reset terminal R2, and an output terminal Q2. The set terminal S2 is connected to an output terminal of the AND gate 10314, the reset terminal R2 is connected to a signal line LRLR via a node ND3, and the output terminal Q2 is connected to a node ND4, respectively.

When a high-level signal is inputted to the set terminal S2, the memory circuit 10312 holds the state until a high-level signal is inputted to the reset terminal R2 and outputs the high-level signal to the output terminal Q2.

When the memory circuit 10312 holds a state of a high level (logical value is 1), this represents that the transfer transistor 122, the selection transistor 124, and the reset transistor 125 are controlled and the pixel data is read from the pixel circuit 101A.

Noted, each of the above-described respective memory circuits 10311 and 10312 may be flip flops, and may be latch circuits, et al, for example as long as a storage function is provided, and the circuits are not limited to those in present embodiment.

With respect to the AND gate 10313, a first input terminal thereof is connected via a node ND5 to the address decoder 102, a second input terminal is connected via a node ND6 to the signal line LSLS, and an output terminal is connected to the set terminal S1 of the memory circuit 10311, respectively.

With respect to the AND gate 10314, a first input terminal thereof is connected via the node ND5 to the address decoder 102, a second input terminal is connected via a node ND7 to the signal line LRLS, and an output terminal is connected to the set terminal S2 of the memory circuit 10312, respectively.

Subsequently, a connection mode of the timing control circuit 1032 is described.

The timing control circuit 1032 includes AND gates 10321 to 10325 and OR gates 10326 and 10327.

With respect to the AND gate 10321, a first input terminal thereof is connected via a node ND8 to the signal line LRT, a second input terminal is connected to the node ND4, and an output terminal is connected to a second input terminal of the OR gate 10326, respectively.

With respect to the AND gate 10322, a first input terminal thereof is connected via a node ND9 to a signal line LRR, a second input terminal is connected to a node ND10, and an output terminal is connected to a second input terminal of the OR gate 10327, respectively.

With respect to the AND gate 10323, a first input terminal thereof is connected via a node ND11 to a signal line LRS, a second input terminal is connected to the node ND10, and an output terminal is connected to a selection control line LSEL, respectively.

With respect to the AND gate 10324, a first input terminal is connected via a node ND12 to a signal line LST, a second input terminal is connected to the node ND2, and an output terminal is connected to a first input terminal of the OR gate 10326, respectively.

With respect to the AND gate 10325, a first input terminal is connected via a node ND13 to a signal line LSR, a second input terminal is connected to the node ND2, and an output terminal is connected to a first input terminal of the OR gate 10327, respectively.

To simplify the description, names of the respective signal lines through which the output signal of the timing control circuit 1032 is supplied are identical with names of the respective signal lines through which the output signal of the pixel drive unit 104 is supplied (the reset control line LRST, the transfer control line LTx, and the selection control line LSEL).

With respect to the OR gate 10326, the first input terminal thereof is connected to the output terminal of the AND gate 10324, the second input terminal is connected to the output terminal of the AND gate 10321, and the output terminal is connected to the transfer control line LTx, respectively.

With respect to the OR gate 10327, the first input terminal is connected to the output terminal of the AND gate 10325, the second input terminal is connected to the output terminal of the AND gate 10322, and the output terminal is connected to the reset control line LRST, respectively.

As shown in FIG. 3, the memory circuit 1031 and the timing control circuit 1032 are mutually connected via the node ND2 and the node ND4.

Subsequently, an operation of the CMOS image sensor 100 is described by focusing on the memory circuit 1031 and the timing control circuit 1032 with reference to FIG. 1, FIG. 3, and FIG. 4, where appropriate.

Figure 4:
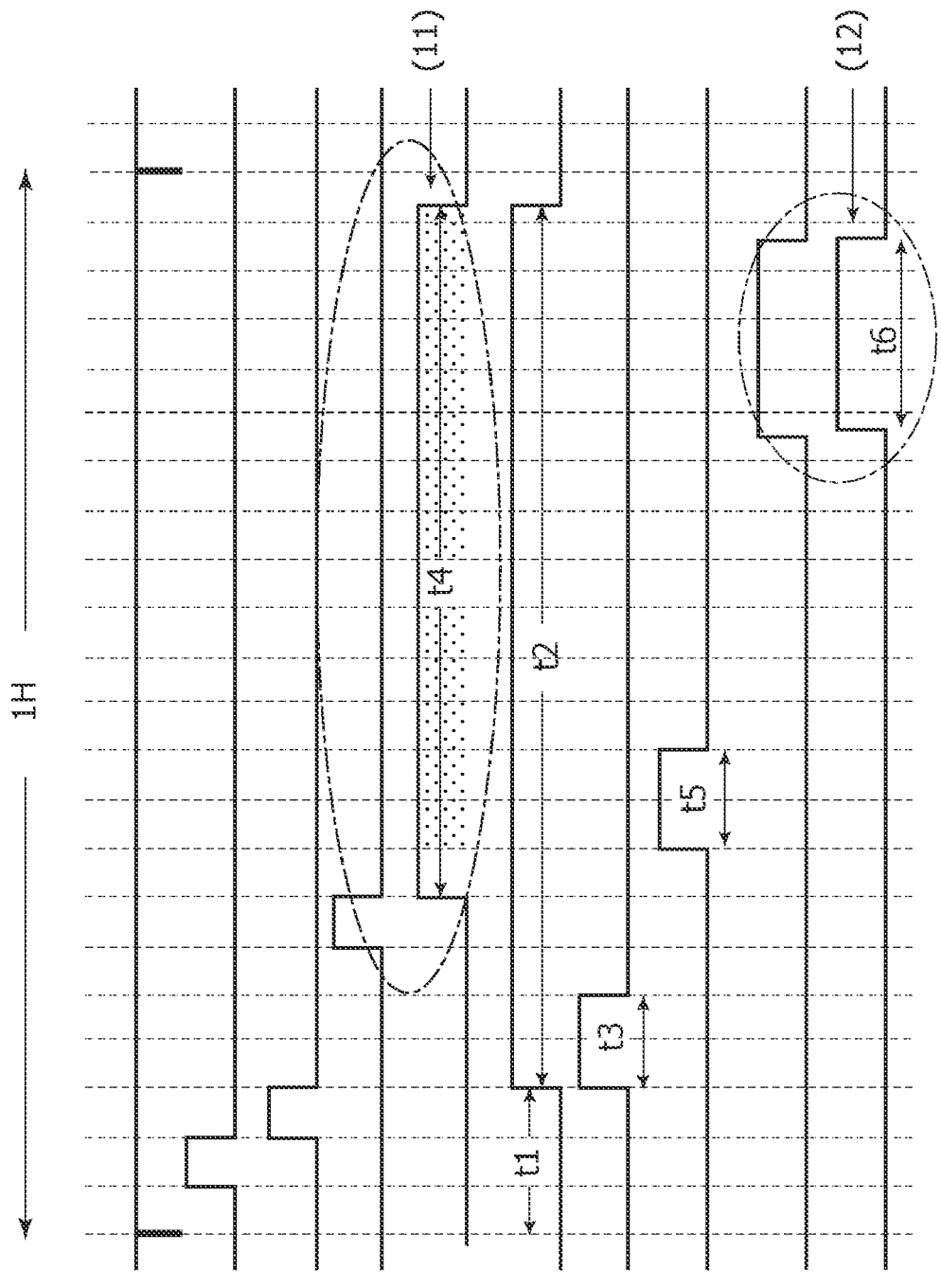
FIG. 4 is a timing chart of a CMOS image sensor in which the pixel drive pulse generating circuit according to a first configuration example is adopted.

FIG. 4 is a timing chart of a CMOS image sensor in which the pixel drive pulse generating circuit according to present configuration example is adopted.

Hsync in (1) in FIG. 4 represents one horizontal time period, (2) to (5) in FIG. 4 represent memory control signals RLR, RLS, SLR, and SLS (the memory control signal S1031 in FIG. 2) to be supplied to the signal lines LRLR, LRLS, LSLR, LSLS constituting the memory circuit 1031 in FIG. 3, and (6) to (10) in FIG. 4 represent timing control signals RS, RR, RT, SR, and ST (the timing control signal S1032 in FIG. 2) to be supplied to the signal lines LRS, LRR, LRT, LSR, and LST which constitute the timing control circuit 1032 in FIG. 3.

In the one horizontal time period shown in (1) in FIG. 4, during a normal operation time, the switch 110 connects the fixed contact a and the actuating contact b (see FIG. 1) by the switching signal SW (not shown). Accordingly, via the power supply terminals TV1 to TV5, the address decoder 102, the pixel drive pulse generating circuit 103, the pixel drive unit 104, the pixel output data parallel-serial processing unit 105, the output circuit unit 106, and the sensor controlling unit 107 of the IC chip 112 are supplied with the power supply voltage VDD1 by the power supply 108.

Similarly, the switch 111 connects the fixed contact a and the actuating contact b (see FIG. 1) by the switching signal SW (not shown). Accordingly, via the power supply terminals TV6 and TV7, the level shifter group 1041 within the pixel drive unit 104 and the respective power supply lines LVDD of the pixel array unit 101 in the IC chip 112 are supplied with the power supply voltage VDD2 by the power supply 109.

In such a state, the sensor controlling unit 107 generates an address for designating the pixel arrangement row to be accessed, and the generated address is sent to the address decoder 102 as the address control signal S102. Subsequently, the address decoder 102 outputs to the memory circuit 1031 the address selection signal AD which causes the output corresponding to the designated pixel row to become active (see FIGS. 1 and 3).

By the high-level memory control signal RLR ((2) in FIG. 4), the memory circuit 10312 resets a stored content which is inputted to the reset terminal R2 (e.g., a low level in which a logical value becomes 0).

Thereafter, the high-level memory control signal RLS ((3) in FIG. 4) is inputted to the second input terminal of the AND gate 10314, and the high-level address selection signal AD is inputted to the first input terminal. As a result, the output of the AND gate 10314 becomes a high level. The memory circuit 10312 stores an active state (e.g., a high level in which a logical value becomes 1) by the high-level signal inputted to the set terminal S2, and outputs the storage state to the output terminal Q2.

In this time period, the transfer transistor 122, the reset transistor 125, and the selection transistor 124 of the pixel circuit 101A in the designated pixel row are at off state, and therefore, the photodiode 121 converts the incident light into an electric charge, and accumulates the electric charge during a time period t1.

After completion of the electric charge accumulation (time period t1), the output of the memory circuit 10312 in an active state is inputted to the second input terminals of the AND gates 10322 and 10323, the high-level timing control signal RS is inputted to the first input terminal of the AND gate 10323 during a time period t2 ((6) in FIG. 4), and the high-level timing control signal RR is inputted to the first input terminal of the AND gate 10322 during a time period t3 ((7) in FIG. 4). As a result, both of the outputs of the AND gates 10322 and 10323 become a high level.

The high-level signal outputted by the AND gate 10322 is inputted to the second input terminal of the OR gate 10327, and whereby, the output of the OR gate 10327 becomes a high level.

The timing control circuit 1032 outputs the high-level selection control signal SEL during a time period until the electronic shutter process is completed (time period t2), and outputs the high-level reset control signal RST during the time period t3.

By this operation, the potential of the floating diffusion FD is reset to the potential of the reset control line LRST (FIG. 1).

After resetting the potential of the floating diffusion FD, the high-level memory control signal SLR is inputted to the reset terminal R1 ((4) in FIG. 4), and the memory circuit 10311 resets the storage content.

The first input terminal of the AND gate 10313 is inputted with the high-level address selection signal AD, and the second input terminal is inputted with the high-level memory control signal SLS during a time period t4 ((5) in FIG. 4). Accordingly, the output of the AND gate 10313 becomes a high level.

By the high-level signal inputted to the set terminal S1, the memory circuit 10311 stores an active state during a time period until the electronic shutter process is completed (time period t4), and outputs the storage state to the output terminal Q1.

Subsequently, the first input terminal of the AND gate 10321 is inputted with the high-level timing control signal RT during a time period t5 ((8) in FIG. 4) and the second input terminal is inputted with the output of the memory circuit 10312 in an active state, and whereby, the output of the AND gate 10321 becomes a high level.

The second input terminal of the OR gate 10326 is inputted with the high-level signal outputted by the AND gate 10321, and the timing control circuit 1032 outputs the high-level transfer control signal Tx during the time period t5.

Accordingly, the electric charges accumulated in the photodiode 121 of the pixel circuit 101A corresponding to the pixel row designated by the address decoder 102 are transferred to the floating diffusion FD.

The amplifier transistor 123 amplifies the potential of the floating diffusion FD corresponding to the amount of electric charges.

At this time, since the selection transistor 124 is at on state, the output of the image data (voltage signal) from the pixel circuit 101A is transferred per each row via the signal line LSGN to the pixel output data parallel-serial processing unit 105.

Subsequently, the electronic shutter process is performed. The first input terminal of the AND gate 10325 is inputted with the high-level timing control signal SR during a time period t6 ((9) in FIG. 4), and the first input terminal of the AND gate 10324 is inputted with the high-level timing control signal ST during the time period t6 ((10) in FIG. 4).

Further, the second input terminals of the both AND gates are commonly inputted with the output of the memory circuit 10311 in an active state, and thus, the outputs of the both AND gates become a high level.

The first input terminal of the OR gate 10326 is inputted with the high-level signal outputted by the AND gate 10324 and the first input terminal of the OR gate 10327 is inputted with the high-level signal outputted by the AND gate 10325, respectively, and the timing control circuit 1032 outputs both of the high-level transfer control signal Tx and the reset control signal RST during the time period t6 ((12) in FIG. 4).

Accordingly, all the electric charges remaining in the photodiode 121 are discharged via the signal line LSGN from the pixel circuit 101A, and the electronic shutter process is completed.

After completion of the electronic shutter process, the image data is outputted per each pixel from the pixel output data parallel-serial processing unit 10, and the image data is outputted to exterior of the chip through the output circuit unit 106. Thus, the one horizontal time period operation is completed.

As described above, in present embodiment, the memory circuit 1031 has the first memory circuit 10311 and the second memory circuit 10312, and as shown in (11) and (12) in FIG. 4, the first memory circuit 10311 holds the storage state until completion of the electronic shutter process. Thus, even if a voltage variation occurs in a circuit, such as the pixel drive pulse circuit, there is an advantage in that a risk, such as a malfunction caused by a rewriting of the memory circuit 1031 (memory circuit 10311) may be avoided.

In present embodiment, the timing control circuit 1032 in the pixel drive pulse generating circuit 103 controls the pixel array, and thus, there is an advantage in that the electronic shutter process may be realized by a simple circuit change without increasing a circuit area.

In present embodiment, in order to decrease a leak current caused in a whole of the chip, the following functions are provided.

As illustrated in FIG. 1, when the control signal SCTL is supplied to the input terminal TI1 at a high level, at least the transfer control line LTx may be caused to be a low level in the pixel drive unit 104 irrespective of the pulse signal from the pixel drive pulse generating circuit 103, and the pixel circuit 101A may be fixed to the electric-charge (signal) accumulating state.

At this time, as described above, during the electric-charge accumulating time period t1 in the pixel array unit 101 (see FIG. 4), the switch 110 is supplied with the switching signal SW so that the fixed contact a and the actuating contact c are connected during the electric-charge accumulating time period in the pixel array unit 101. Accordingly, the power supply terminals TV1, TV3, TV4, and TV5 are connected to the ground potential, and supply of the power supply voltage VDD1 by the power supply 108 to the address decoder 102, the pixel drive pulse generating circuit 103, the pixel output data parallel-serial processing unit 105, the output circuit unit 106, and the sensor controlling unit 107 of the IC chip 112 is stopped.

Similarly, the switch 111 is supplied with the switching signal SW so that the fixed contact a and the actuating contact c are connected. Accordingly, the power supply terminal TV7 is connected to the ground potential, and the supply of the power supply voltage VDD2 by the power supply 109 to the respective power supply lines of the pixel array unit 101 of the IC chip 112 is stopped, and the respective power supply lines LVDD of the pixel array unit 101 is kept to the ground potential.

In this manner, even if supply of the power supply to the circuits other than the pixel drive unit 104 is stopped, the pixel may keep the accumulating state.

After the electric-charge accumulation, the fixed contacts a of the switches 110 and 111 may both be switched to the actuating contacts b to perform the operation of the above-described CMOS image sensor 100.

Even in this way, in present embodiment, the above-described electronic shutter process may be executed, and the leaked current caused in the whole of the chip may be reduced to only to a portion of the pixel drive unit 104.

(Second Configuration Example of the Pixel Drive Pulse Generating Circuit)

Subsequently, a second configuration example of the pixel drive pulse generating circuit 103 is described in details.

Figure 5:
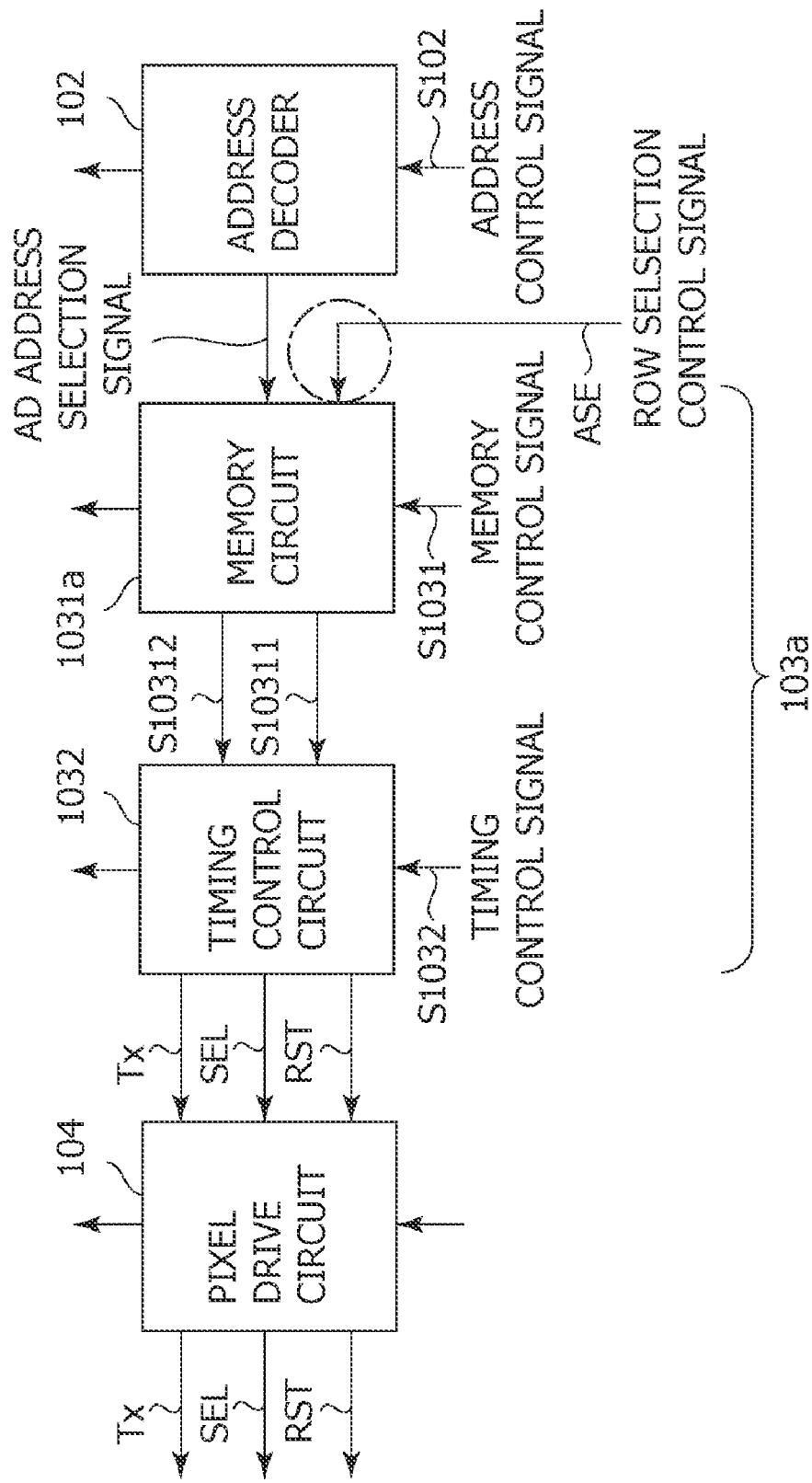
FIG. 5 is a block diagram showing a second configuration example of a pixel drive pulse generating circuit according to present embodiment.
Figure 6:
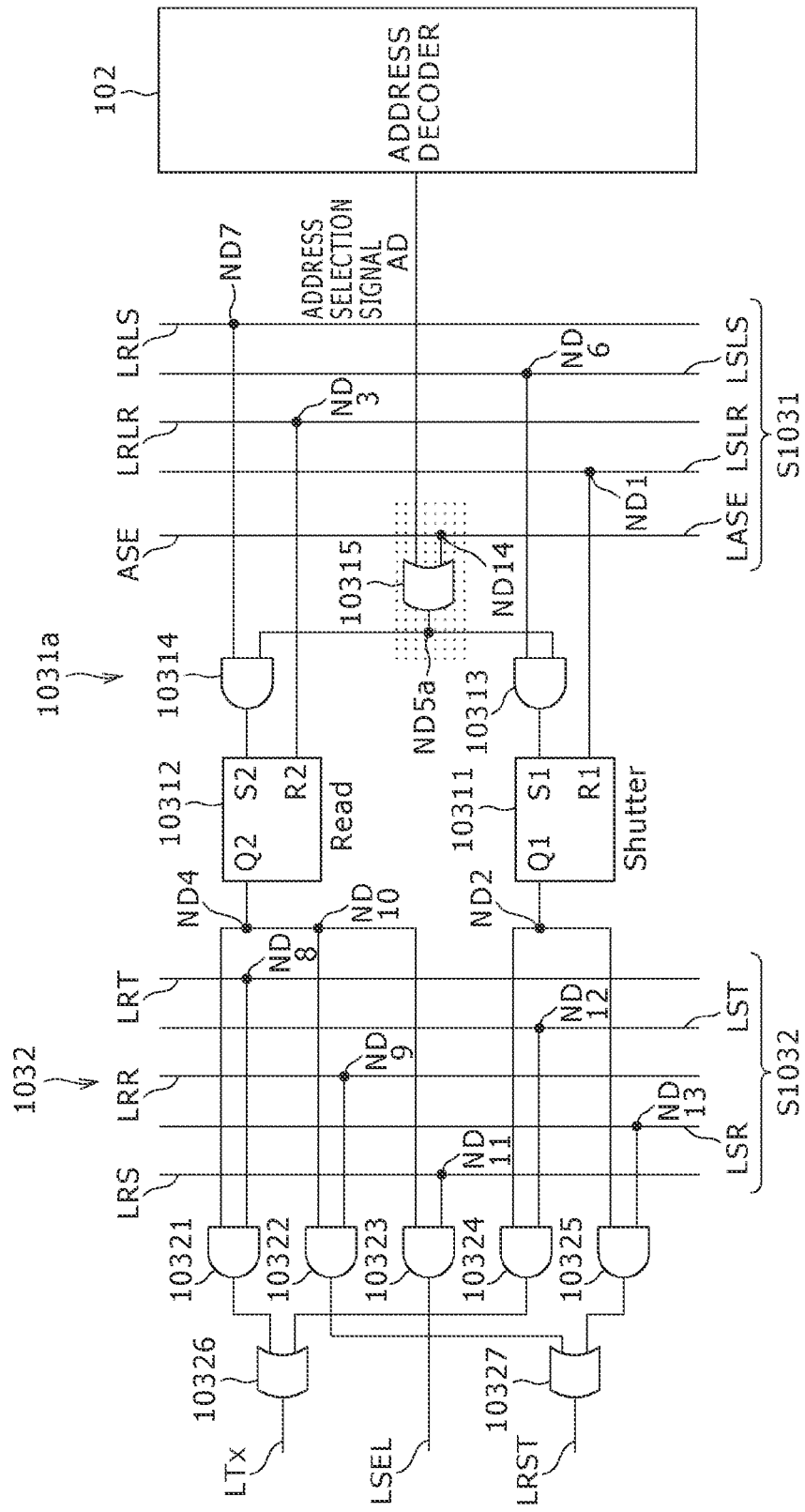
FIG. 6 is a detailed circuit diagram of the pixel drive pulse generating circuit in FIG. 5.
Figure 7:
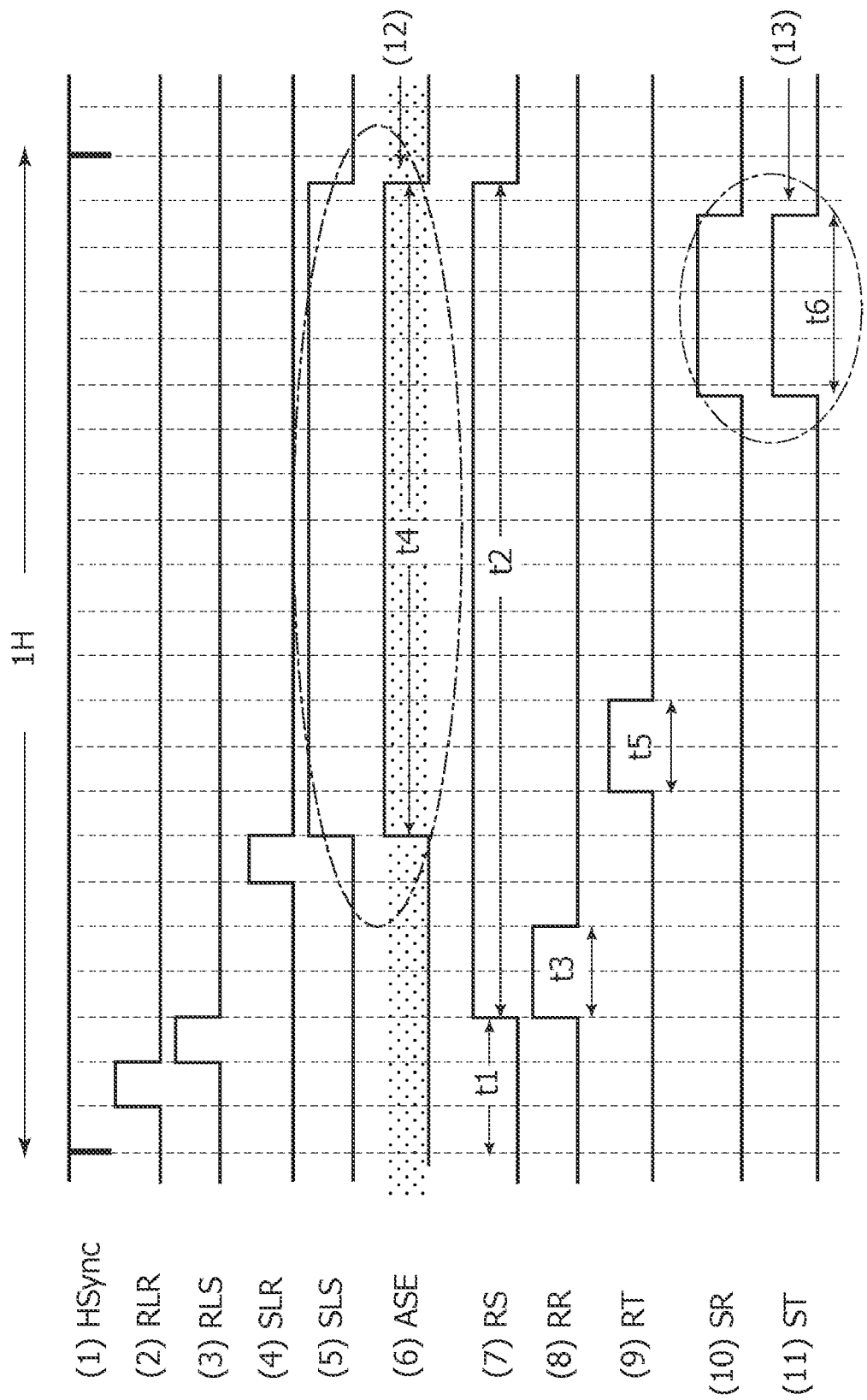
FIG. 7 is a timing chart of a CMOS image sensor in which the pixel drive pulse generating circuit according to present configuration example is adopted.

FIG. 5 is a block diagram showing a second configuration example of the pixel drive pulse generating circuit according to present embodiment. FIG. 6 is a detailed circuit diagram of the pixel drive pulse generating circuit in FIG. 5. FIG. 7 is a timing chart of a CMOS image sensor in which the pixel drive pulse generating circuit according to present configuration example is adopted.

In order to simplify descriptions, in FIGS. 5 and 6, only a portion corresponding to a pixel arrangement of a first row in FIG. 1, for example, is illustrated, and the only illustrated portion is described.

The first configuration example is so configured that the address decoder 102 has the subject-row selection circuit (not shown), but the configuration example is so configured that irrespective of presence or absence of the subject-row selection circuit, the electronic shutter process may be executed.

A specific difference between present configuration example and the first configuration example is that: the address decoder 102 does not include the subject-row selection circuit, a row selection control signal ASE is inputted to a memory circuit 1031a of a pixel drive pulse generating circuit 103a, as shown in FIG. 5, and an OR gate 10315 and a signal line LASE supplied with the row selection control signal ASE are provided, as shown in FIG. 6.

The pixel drive pulse generating circuit 103 is so configured that in the OR gate 10315, a first input terminal is connected via a node ND14 to the signal line LASE, a second input terminal is connected to the address decoder 102, and an output terminal is connected to a node ND5a, respectively, as shown in FIG. 6. The OR gate 10315 corresponds to the logical circuit of the present invention.

In the configuration example, as shown in (10) and (11) in FIG. 7, during a time period until the electronic shutter process for the pixel arrangement row intended to select is ended, i.e., during the time period t4 which is equal to that of the memory control signal SLS, the sensor controlling unit 107 supplies the high-level row selection control signal ASE to the signal line LASE. During this period, since the first input terminal of the OR gate 10315 is inputted with the high-level row selection control signal ASE, the OR gate 10315 outputs a high-level signal even if the second input terminal is not inputted with the address selection signal AD and causes the memory circuit 10311 to store information for performing the electronic shutter process.

Therefore, the pixel drive pulse generating circuit 103 may execute the electronic shutter process on the pixel circuit 101A of the selected pixel arrangement while selecting the pixel arrangement to be subject to the electronic shutter process.

As described above, also in the configuration example, as shown in (12) and (13) in FIG. 7, the first memory circuit 10311 holds the storage state until the end of the electronic shutter process, and whereby there is an advantage in that a risk such as a malfunction caused by a rewriting of the memory circuit 1031a may be avoided.

Also in the configuration example, there is an advantage in that the electronic shutter process may be realized by a simple circuit change without increasing a circuit area.

Further, the configuration example is preferable when it is required to surely hold the storage state of the memory circuit 1031a not only at a time of the electronic shutter process but also at a time of the global shutter.

(Third Configuration Example of the Pixel Drive Pulse Generating Circuit)

Subsequently, a third configuration example of the pixel drive pulse generating circuit 103 is described in details.

Figure 8:
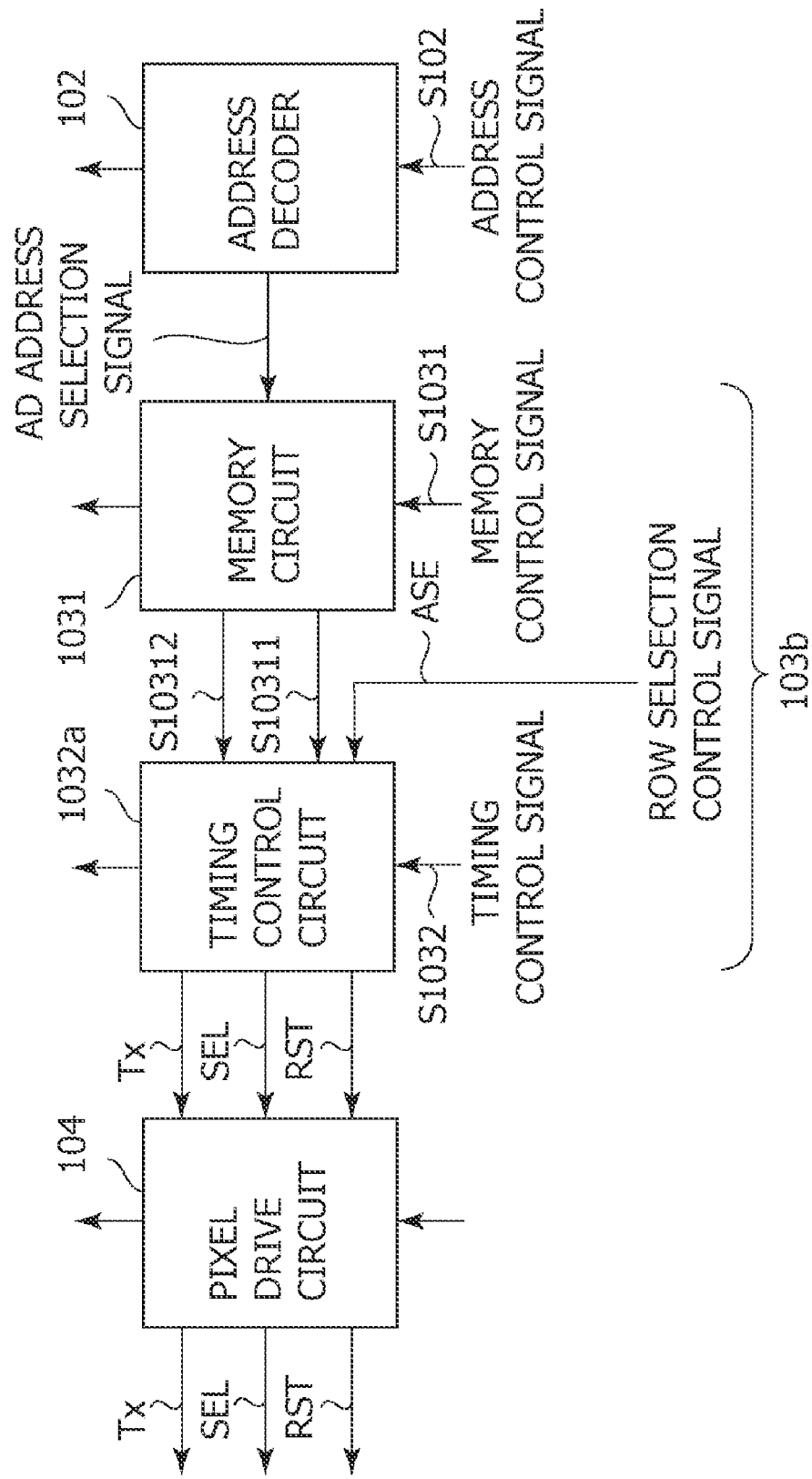
FIG. 8 is a block diagram showing a third configuration example of a pixel drive pulse generating circuit according to present embodiment.
Figure 9:
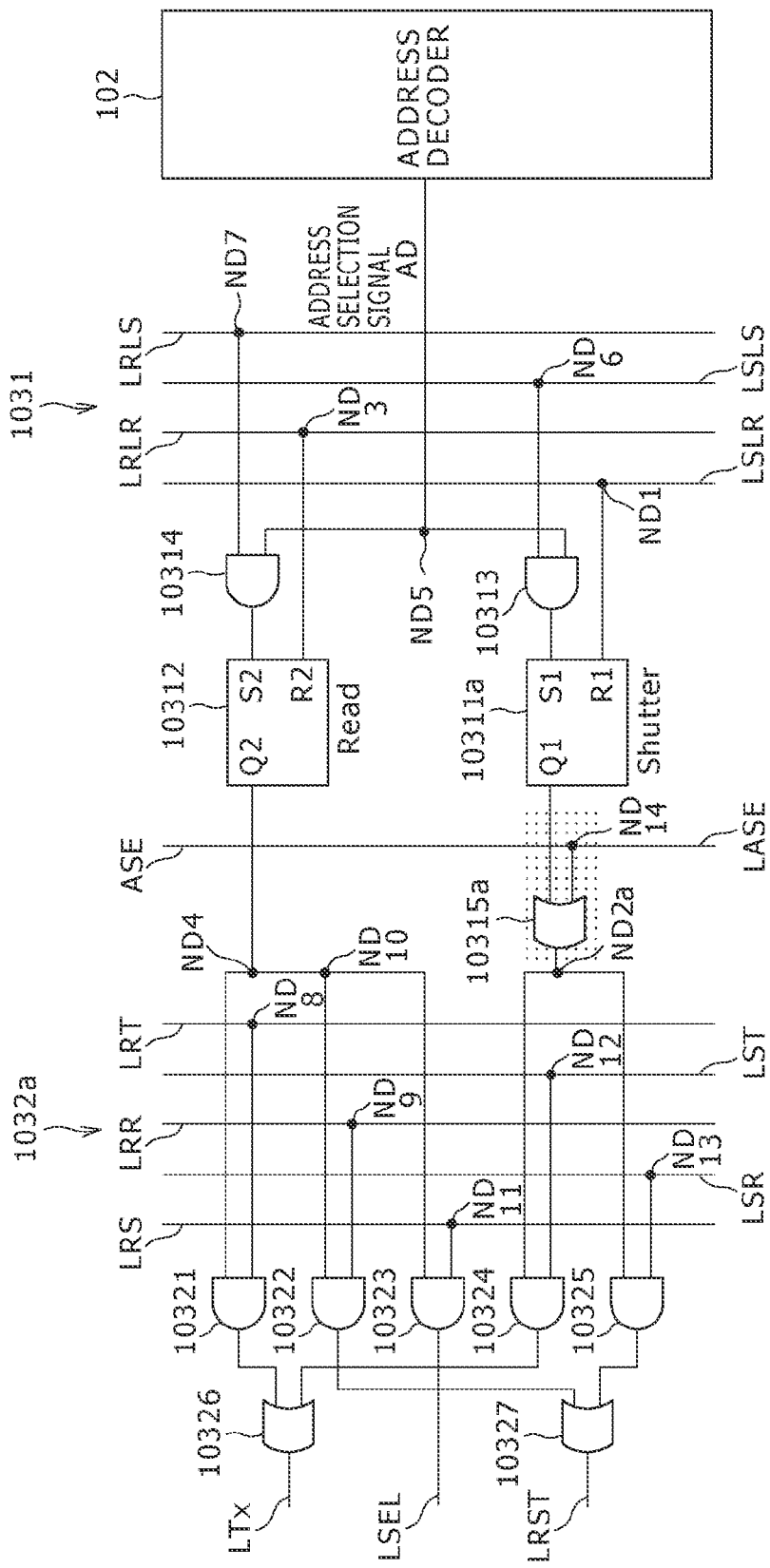
FIG. 9 is a detailed circuit diagram of the pixel drive pulse generating circuit in FIG. 8.
Figure 10:
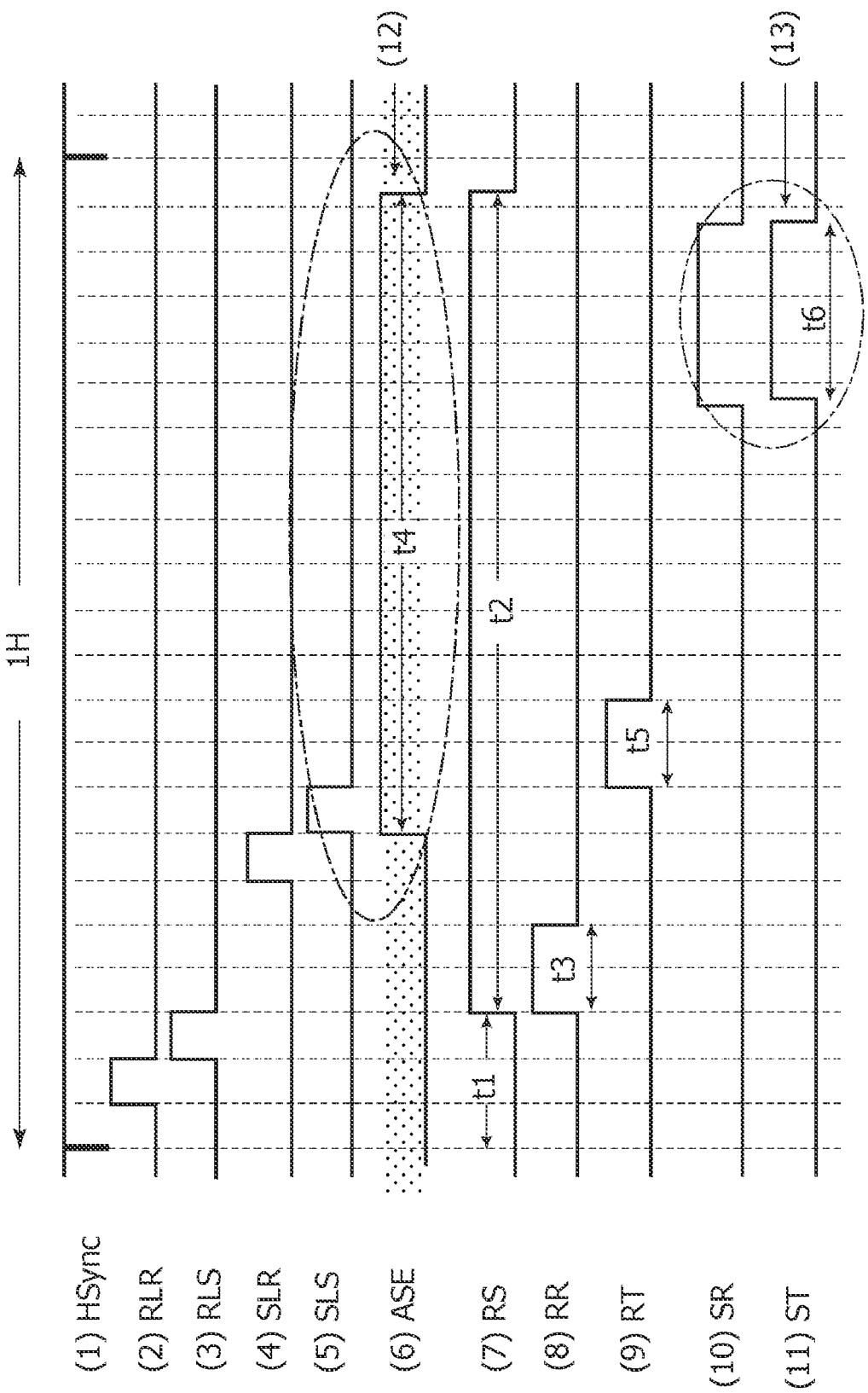
FIG. 10 is a timing chart of a CMOS image sensor in which the pixel drive pulse generating circuit according to present configuration example is adopted.

FIG. 8 is a block diagram showing a third configuration example of the pixel drive pulse generating circuit according to present embodiment. FIG. 9 is a detailed circuit diagram of the pixel drive pulse generating circuit in FIG. 8. FIG. 10 is a timing chart of a CMOS image sensor in which the pixel drive pulse generating circuit according to the configuration example is adopted.

To simplify descriptions, in FIGS. 8 and 9, only a portion corresponding to a pixel arrangement of a first row in FIG. 1, for example, is illustrated, and the only illustrated portion is described.

As similar to the second configuration example, in present configuration example, the electronic shutter process may be executed irrespective of presence or absence of the subject-row selection circuit. However, the arrangement of the OR gate 10315 and the signal line LASE to which the row selection control signal ASE is supplied, is different.

Hereinafter, only the difference between the first and second configuration examples is described.

As shown in FIG. 8, in the configuration example, a timing control circuit 1032a of a pixel drive pulse generating circuit 103b is inputted with the row selection control signal ASE. As shown in FIG. 9, an OR gate 10315a and the signal line LASE are arranged in a timing control circuit 1032a.

In the OR gate 10315a, a first input terminal is connected via the node ND14 to the signal line LASE, a second input terminal is connected to an output terminal Q1 of a memory circuit 10311a, and an output terminal is connected to a node ND2a, respectively.

In the configuration example, a memory control signal SLS to be supplied to the memory circuit 10311a, shown in (5) in FIG. 10, is supplied as a pulse signal.

As shown in (6) in FIG. 10, while the electronic shutter process for the pixel arrangement row intended to select is ended, the sensor controlling unit 107 supplies the high-level row selection control signal ASE to the signal line LASE during the time period t4.

In the configuration example, even if the memory circuit 10311a does not store operation information of the electronic shutter process until the electronic shutter process is ended, the high-level row selection control signal ASE is supplied to the signal line LASE during the time period t4, and output of the OR gate 10315a becomes a high level (maintains on state), thereby executing the electronic shutter process for the selected pixel arrangement row.

As described above, in the configuration example, as shown in (12) and (13) in FIG. 10, the high-level row selection control signal ASE is supplied to the signal line LASE until the end of the electronic shutter process, whereby there is an advantage in that a risk, such as a malfunction resulting from a rewriting of the memory circuit 1031 may be avoided.

Also in the configuration example, there is an advantage in that the electronic shutter process may be realized by a simple circuit change without increasing a circuit area.

Although not particularly limited, the CMOS image sensors according to the respective embodiments may be configured as a CMOS image sensor mounting a column parallel analog-digital converter (hereinafter, abbreviated as ADC), for example.

The image sensor having such an effect may be applied as an image capture device of a digital camera or a video camera.

FIG. 11 is a diagram showing one example of a configuration of a camera system to which an image sensor (image capture device) adopting the pixel drive circuit according to the embodiments of the present invention is applied.

As shown in FIG. 11, a camera system 200 includes an image capture device 210 to which a CMOS image sensor (image capture device) 100 adopting the pixel drive pulse generating circuit 103 according to the embodiment is applicable, an optical system for guiding (forming object image) an incident light to a pixel area of the image capture device 210, for example a lens 220, for forming an image from the incident light (image light) onto an imaging surface, a drive circuit (DRV) 230 for driving the image capture device 210, and a signal processing circuit (PRC) 240 for processing an output signal of the image capture device 210.

The drive circuit 230 includes a timing generator (not shown) for generating various timing signals including a start pulse or a clock pulse for driving a circuit in the image capture device 210, and drives the image capture device 210 at a predetermine timing signal.

The signal processing circuit 240 applies a signal process, such as a CDS (Correlated Double Sampling) to the output signal of the image capture device 210.

An image signal processed at the signal processing circuit 240 is recorded in a recording medium, such as a memory, for example. Image information recorded in the recording medium is hard copied by a printer, or the like. The image signal processed at the signal processing circuit 240 is projected as a moving picture on a monitor formed of a liquid crystal display, et al.

As described above, according to present embodiment, an image sensor includes a plurality of pixel circuits each including a photoelectric converting unit for converting an incident light into an electric charge and accumulating the converted electric charge, the plurality of pixel circuits being arranged in a matrix shape, an address decoder 102 for selecting pixel circuits to be controlled which are arranged on an identical line, a memory circuit 1031 for storing operation information to be executed by the pixel circuit selected by the address decoder 102, and a timing control circuit 1032 for controlling an operation of the pixel circuit selected by the address decoder 102 in accordance with a storage state of the memory circuit 1031.

The timing control circuit 1032 controls a charge discharging operation in which an electric charge remaining in the photoelectric converting unit of each pixel circuit is discharged, and the memory circuit 1031 holds the storage state until the charge discharging operation is completed.

Therefore, even if a voltage variation occurs in a circuit, such as the pixel drive circuit (the address decoder, the pixel drive pulse generating circuit, and the pixel drive unit), et al., there is an advantage in that a risk, such as a malfunction resulting from a rewriting of the memory circuit not only at a time of the electronic shutter process but also at a time of the global shutter, may be avoided.

Further, in present embodiment, the timing control circuit in the pixel drive pulse generating circuit controls the pixel arrangement to execute the electronic shutter process, and thus, there is an advantage in that not only an increase in circuit area may be reduced, but also the electronic shutter process may be realized by a simple circuit change.

Furthermore, in present embodiment, a resistance property with respect to a circuit voltage drop may be enforced without impairing the advantages such as a degree of freedom of the electronic shutter process and a reduction in area, and thus, a performance of the camera system adopting the image capture device is improved.

According to present embodiment, at a time of accumulation for long hours, a heat generation derived from an off-leak of a circuit integrated on the CMOS image sensor may be inhibited, and a dark current generation resulting from the heat generation, i.e., a deterioration of an image quality may be suppressed.

As compared to an off-leak suppression technology using a general substrate bias effect, the present invention may be applied only by turning on or off the power supply, and thus, both a chip circuit configuration and a system configuration may be more easily designed.

It should be understood by those skilled in the art that various modifications, combinations, sub-combinations and alterations may occur depending on design requirements and other factors insofar as they are within the scope of the appended claims or the equivalents thereof.

What is claimed is:

1. A pixel drive circuit, comprising:
a plurality of pixel circuits each including a photoelectric converting unit for converting an incident light into an electric charge and accumulating the converted electric charge, the plurality of pixel circuits being arranged in a matrix shape;
an address decoder for selecting the pixel circuits to be controlled which are arranged on an identical line;
a storage circuit for storing operation information to be executed by the pixel circuits selected by the address decoder; and
a control circuit for controlling an operation of the pixel circuits selected by the address decoder in accordance with a storage state of the storage circuit, wherein;
the control circuit controls a charge discharging operation of discharging an electric charge remaining in the photoelectric converting unit of each of the pixel circuits, and
the storage circuit holds the storage state until the charge discharging operation is completed,
wherein,
both a row selection signal and an address selection signal output by the address decoder are received by the storage circuit in such a way that either signal causes the control circuit to effect the charge discharging operation.

2. The pixel drive circuit according to claim 1, wherein; the storage circuit includes;
a first storage circuit for storing information of the charge discharging operation, and
a second storage circuit for storing operation information other than the charge discharging operation.

3. The pixel drive circuit according to claim 2, wherein the storage circuit includes a logical circuit for causing the storage circuit to store the information of the charge discharging operation based on the output of the address decoder or the row selection signal.

4. The pixel drive circuit according to claim 3, wherein the logical circuit controls the electric-charge discharging operation of each of the pixel circuits until the charge discharging operation is completed.

5. A pixel drive circuit, comprising:
a plurality of pixel circuits each including a photoelectric converting unit for converting an incident light into an electric charge and accumulating the converted electric charge, the plurality of pixel circuits being arranged in a matrix shape;
an address decoder for selecting the pixel circuits to be controlled which are arranged on an identical line;
a storage circuit for storing operation information to be executed by the pixel circuits selected by the address decoder; and
a control circuit for controlling an operation of the pixel circuits selected by the address decoder in accordance with a storage state of the storage circuit, wherein;
the pixel circuits include (a) a node to which an electric charge accumulated by the photoelectric converting unit is supplied, (b) an electric-charge discharging unit for discharging the electric charge of the node, (c) an output unit for amplifying a potential of the node corresponding to an amount of the electric charge and outputting the amplified potential,
the control circuit controls the electric-charge discharging unit to execute a charge discharging operation for discharging an electric charge accumulated by the photoelectric converting unit,
the storage circuit holds the storage state until the charge discharging operation is completed, and
both a row selection signal and an address selection signal output by the address decoder are received by the storage circuit in such a way that either signal causes the control circuit to effect the charge discharging operation.

6. The pixel drive circuit according to claim 5, wherein the storage circuit includes:
a first storage circuit for storing information of the charge discharging operation; and
a second storage circuit for storing operation information other than the charge discharging operation.

7. The pixel drive circuit according to claim 6, wherein the storage circuit includes a logical circuit for causing the storage circuit to store the information of the charge discharging operation irrespective of output of the address decoder.

8. The pixel drive circuit according to claim 7, wherein the logical circuit controls the charge discharging operation of each of the pixel circuits until the charge discharging operation is completed.

9. An image capture device, comprising:
a plurality of pixel circuits each including a photoelectric converting unit for converting an incident light into an electric charge and accumulating the converted electric charge, the plurality of pixel circuits being arranged in a matrix shape;
a pixel drive circuit for successively selecting and controlling the pixel circuits; and
a reading unit for reading a signal from the pixel circuits controlled by the pixel drive circuit,
wherein,
the pixel drive circuit includes(a) an address decoder for selecting the pixel circuits to be controlled which are arranged on an identical line, (b)
a storage circuit for storing operation information to be executed by the pixel circuits selected by the address decoder, and (c) a control circuit for controlling an operation of the pixel circuits selected by the address decoder in accordance with a storage state of the storage circuit,
the control circuit controls a charge discharging operation of discharging an electric charge remaining in the photoelectric converting unit of each of the pixel circuits,
the storage circuit holds the storage state until the charge discharging operation is completed, and
both a row selection signal and an address selection signal output by the address decoder are received by the storage circuit in such a way that either signal causes the control circuit to effect the charge discharging operation.

10. A camera system, comprising:
an image capture device;
an optical system for guiding an incident light to an imaging area of the image capture device; and
a signal processing circuit for processing a signal outputted by the image capture device, wherein,
the image capture device includes (a) a plurality of pixel circuits each including a photoelectric converting unit for converting an incident light into an electric charge and accumulating the converted electric charge, the plurality of pixel circuits being arranged in a matrix shape, (b) a pixel drive circuit for successively selecting and controlling the pixel circuits, and (c) a reading unit for reading a signal from the pixel circuits controlled by the pixel drive circuit,
the pixel drive circuit includes (a) an address decoder for selecting the pixel circuits to be controlled which are arranged on an identical line, (b)
a storage circuit for storing operation information to be executed by the pixel circuits selected by the address decoder, and (c) a control circuit for controlling an operation of the pixel circuits selected by the address decoder in accordance with a storage state of the storage circuit,
the control circuit controls a charge discharging operation of discharging an electric charge remaining in the photoelectric converting unit of each of the pixel circuits,
the storage circuit holds the storage state until the charge discharging operation is completed, and
both a row selection signal and an address selection signal output by the address decoder are received by the storage circuit in such a way that either signal causes the control circuit to effect the charge discharging operation.

* * * * *